Patented Nov. 19, 1946

2,411,276

UNITED STATES PATENT OFFICE 2,411,276

ORGANOPOLYSULFIDE RUBBER

Ivar H. Kinneberg and Charles L. Thomas, Riverside, Ill., assignors to Universal Oil Products Company, Chicago, Ill., a corporation of Delaware No Drawing. Application March 12, 1943,
Serial No. 478,966

9 Claims. (Cl. 260—79)

An object of this invention is the conversion of olefinic hydrocarbons and halo-olefins into a rubber-like material having elastic and tensile properties and other desirable characteristics of natural rubber.

Another object of this invention is the production of a synthetic rubber from a hydrocarbon of the olefin or ethylene series and chloro-olefin by a process comprising the treatment of said olefin and halo-olefin with sulfur monochloride to form a mixture of polychlorodialkyl sulfides and the condensation of said polychlorodialkyl sulfides with an aqueous solution of a water-soluble polysulfide.

A further object of this invention is the use of propylene and a chloro-olefin as starting materials for the production of a synthetic rubber having not only good rubber-like properties but also a high degree of resistance to oxidation and to swelling when in contact with oil.

In accordance with the present invention we are able to produce a rubber-like material having high tensile strength, good elasticity, and other desirable characteristics of natural rubber by a series of reactions in which propylene or a propane-propylene fraction is treated with sulfur monochloride preferably in the presence of an alcohol and the resultant reaction product is reacted further with a water-soluble inorganic polysulfide in the presence of a polyhalodialkyl sulfide having more than two halogen atoms per molecule.

One specific embodiment of the present invention relates to a process which comprises reacting a dichlorodipropyl sulfide and a polyhalodialkyl sulfide having more than two halogen atoms per molecule with a water-soluble inorganic polysulfide to form a rubber-like material.

Propylene which is the hydrocarbon preferably utilized as a starting material for the process of this invention may be obtained from any source including the catalytic dehydration of a propyl alcohol, the separation of a propane-propylene fraction from cracked gases, the catalytic or thermal dehydrogenation of propane to propylene, etc. It is not to be inferred that the different propylene-containing fractions mentioned above are necessarily equivalent to propylene of high purity resulting from catalytic dehydration of a propyl alcohol.

Sulfur monochloride, which is generally represented by the formula $S_2Cl_2$, is producible by the action of chlorine on sulfur or of chlorine on a metal sulfide. As sulfur monochloride is now a commercial product, further details of its manufacture are not described herein.

The reaction of sulfur monochloride with an olefin results in the formation of a dihalo dialkyl sulfide. When propylene is the olefin so treated with sulfur monochloride, the principal reaction product is beta,beta'-dichlorodipropyl sulfide, the chemical structure of which may be expressed by one or more of the following formulae:

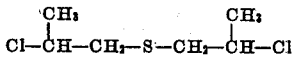

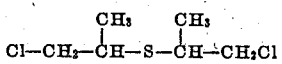

or,

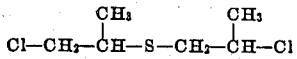

The condensation of beta,beta'-dichlorodipropyl sulfide with an inorganic polysulfide, such as sodium tetrasulfide, results in the formation of a long chain polymer or linear polymer, the structural unit of which may be expressed as follows:

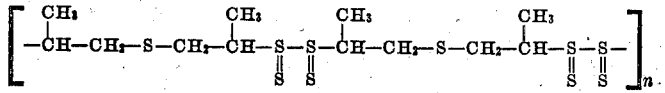

When beta,beta'-dichlorodipropyl sulfide is condensed with sodium polysulfide under preferred conditions of operation which include a temperature of from about 60° to about 100° C., and in the presence of a dispersing agent such as magnesium hydroxide, the resultant product is a somewhat plastic rubber-like material with physical properties resembling those of natural rubber.

In accordance with the process of this invention, we propose to reduce the plasticity and also improve the other rubber-like properties of the above indicated reaction product by commingling with the beta,beta'-dichlorodipropyl sulfide a relatively minor amount of a more highly halogenated dialkyl sulfide so that this mixture on treatment with an inorganic polysulfide will yield a polymeric material in which long chains of carbon and sulfur atoms are cross-linked with other carbon and sulfur atoms so as to form what may be termed a spatial polymer. For example, the reaction of sulfur monochloride with allyl chloride may produce beta,gamma,beta',-gamma'-tetrachlorodipropyl sulfides. The structure of different chloropropyl sulfides producible from allyl chloride and sulfur monochloride may be represented by one or more of the following formulae:

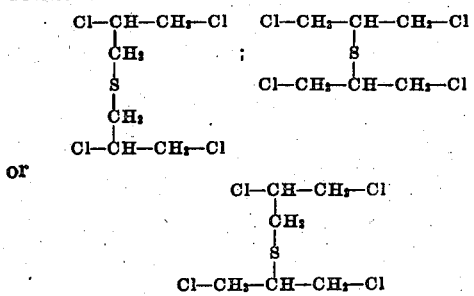

When allyl chloride and propylene react with sulfur monochloride, certain amounts of beta,beta'-dichlorodipropyl sulfide containing up to about 25 mole per cent of beta,gamma,beta',gamma'-tetrachlorodipropyl sulfide, but preferably not more than from 5 to 10 mole per cent of the latter material, is reacted with sodium tetrasulfide, a rubber-like polymer is formed consisting of cross-linked long chain polymers, the structural unit of which may be represented as follows:

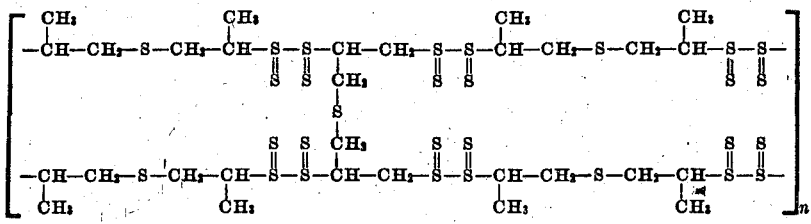

The beta, gamma, beta', gamma'-tetrachlorodipropyl sulfide or other tri- or tetrachlorodipropyl sulfide referred to above may be prepared by the reaction of allyl chloride with sulfur monochloride. In effecting this reaction the allyl chloride may be added drop-wise to the reaction mixture during absorption of propylene in sulfur monochloride; or vaporized into the stream of propylene prior to reaction with sulfur monochloride; or when the absorption of propylene in sulfur monochloride has reached some desirable point below 100% consumption of sulfur monochloride, the introduction of propylene is discontinued and allyl chloride is added in sufficient amount to react with the unconsumed sulfur monochloride. Alternatively, when the absorption of propylene by sulfur monochloride is completed, a further desired amount of sulfur monochloride is added to the reaction product and the equivalent amount of allyl chloride is then introduced.

Although allyl chloride is herein mentioned as a suitable material for introducing the cross-linking between the long chain parts of a spatial polymer, other halo-olefins may be utilized similarly. The halo-olefins so utilized in the process comprise particularly vinyl-, allyl-, and methallyl- chlorides and bromides as well as other halo-olefins, principally chloro- and bromo-olefins. It should be understood that the different halo-olefins are not necessarily equivalent in their action. Furthermore, although the polyhalogenated sulfide which is commingled with the beta,beta'-dichlorodipropyl sulfide is herein referred to as containing beta,gamma,beta',gamma'-tetrachlorodipropyl sulfide, it may also contain in part or wholly instead of the latter a trichlorodipropyl sulfide which will function similarly in producing cross-linking between chains of carbon and sulfur atoms.

In accordance with the process of the present invention, substantially pure propylene or a propane-propylene mixture and a halo-olefin are contacted with sulfur monochloride at a temperature of from about 0° to about 150° C., but preferably at a temperature of from about 40° to about 50° C., and under a pressure up to about 10 atmospheres in a reactor provided with good agitation or mixing. The charging stock containing propylene and the halo-olefin is generally introduced gradually to the well-stirred sulfur monochloride as care is needed to prevent the reaction temperature from becoming too high due to the exothermic nature of the reaction between the unsaturated materials and sulfur monochloride. The propylene or propylene-containing gas is sometimes introduced at such a rate that a small amount of this olefin is not absorbed and escapes from the reaction zone with the effluent gases. The reaction product so formed from propylene, a halo-olefin, and sulfur monochloride may be distilled at reduced pressure to separate dichlorodipropyl sulfide and polychlorodialkyl sulfides from relatively small amounts of higher boiling materials, or the total product may be treated with an aqueous solution of a water-soluble inorganic polysulfide such as sodium polysulfide, of which sodium tetrasulfide, which may be expressed by the general formula $Na_2S_4$, is representative. In order to simplify the description, the mixture of dichlorodipropyl sulfide and polychlorodipropyl sulfides, the latter containing more than 2 chlorine atoms per molecule, is hereinafter referred to by the term "chlorodipropyl sulfides."

Although sodium polysulfide is the water-soluble polysulfide generally employed for treating chlorodipropyl sulfides to produce rubber-like materials, other polysulfides utilizable similarly, although not necessarily under the same conditions of operation, include calcium polysulfide of the general formula $CaS_n$ or potassium polysulfides of the general formula $K_2S_n$ wherein $n$ may vary from 2 to about 5, and polysulfides of basic nitrogen compounds, particularly ammonium polysulfide and tetraalkyl ammonium polysulfides.

The treatment of chlorodipropyl sulfides with an inorganic polysulfide, such as sodium tetrasulfide, is generally carried out by adding slowly the chlorodipropyl sulfides to an aqueous solution of sodium tetrasulfide containing a dispersing agent such as magnesium hydroxide so as to effect a substantially complete reaction between the chlorodipropyl sulfides and the sodium polysulfide and to form a latex-like suspension of a high molecular weight polymeric organic polysulfide. The resultant reaction product herein referred to as a rubber and existing as a latex-like suspension may be washed with water by settling and decantation to remove substantially all water-soluble salts.

The resultant washed latex-like suspension which may contain upwards of 80% or better by weight of a rubber, may be treated with small amounts of an acid, generally a mineral acid such as hydrochloric acid, in order to coagulate the latex-like suspension and to form a coagulum of the rubber-like material which may be compounded in the same manner as crude rubber with reinforcing pigments such as carbon black, fillers, plasticizers, and a vulcanization agent such as zinc oxide with or without sulfur and cured by heat and pressure. Alternatively, the latex-like suspension may be compounded by mixing before coagulation. The raw rubber-like synthetic produced and compounded in accordance with the process of the present invention is suitable for use in the production of tires and many types of mechanical goods heretofore manufactured generally from natural rubber as well as in special applications where oil resistance not possessed by natural rubber is desired. It may also be compounded with natural rubber or hydrocarbon synthetic rubbers to impart oil resistance to them.

The latex-like dispersion obtained as hereinabove set forth may also be utilized as such for impregnating fabrics and other materials or it may be separated by means of a centrifuge into a more highly concentrated latex. The latex-like material so obtained by centrifugation may be utilized as a paint or lacquer for applying a rubber-like coating to metals, fabrics, and other materials.

The following example is given to illustrate the process of the invention, although with no intention of unduly limiting its generally broad scope.

A solution equivalent to 10 mole per cent of beta,gamma,beta',gamma' - tetrachlorodipropyl sulfide in beta,beta'-dichlorodipropyl sulfide was prepared by vaporizing 30 cc. of allyl chloride into a stream of dry propylene which was directed at a rate of 1.5 cubic feet per hour into a reactor containing 150 cc. of sulfur monochloride and provided with good agitation and cooling so as to maintain a reaction temperature of between 45° and 50° C. After the propylene-allyl chloride mixture was so charged during a period of about 6 hours, the sulfur monochloride was completely consumed and a clear yellow oil resulted which contained little or no precipitated sulfur and had a specific gravity of 1.225 at 27° C. The yield of this yellow oil was 92.5% of the theoretical based upon the amount of sulfur monochloride charged.

A sodium polysulfide solution which was reacted with the chlorodipropyl sulfides as hereinafter set forth, was prepared by dissolving technical fused 60% sodium sulfide and a stoichiometric quantity of sulfur in sufficient boiling water to give a 2.5 molar concentration of sodium tetrasulfide. This aqueous solution was heated at boiling for about 20 hours, cooled and filtered through asbestos to give a filtrate with density of about 1.28 at 20° C.

The reaction of the chlorodipropyl sulfide mixture with the sodium tetrasulfide solution was carried out in an electrically heated reactor provided with a mechanically driven stirrer, a reflux condenser, and a thermometer. The general procedure followed in a typical run consisted of placing 0.5 molecular proportion of sodium tetrasulfide solution in the reactor; adding thereto a dispersing agent such as magnesium hydroxide, in which case the magnesium hydroxide was freshly precipitated by successive additions of solutions of sodium hydroxide and magnesium chloride; bringing the reactor contents to a reaction temperature of 60° C., and adding slowly, over a period of 3 hours, 0.45 molar proportion of the chlorodipropyl sulfide mixture to the reaction mixture containing sodium tetrasulfide. The reaction of the chlorodipropyl sulfides with sodium tetrasulfide is exothermic. When addition of the chlorodipropyl sulfides was completed, the resultant reaction mixture was heated under total reflux for 3 hours at a temperature of 100° C., and a latex-like product was formed. The latex-like product was washed by pouring the total reaction mixture into water, the product was permitted to settle, and the supernatant solution was decanted. Five such washings were used in order to obtain a latex-like material substantially free from water-soluble salts, and the resultant latex-like material was acidified with dilute hydrochloric acid to form a coagulated mass of a rubber or rubber-like material which after milling yielded a crumbly, dry sheet of relatively low plasticity. Press-molding of the sheeted material at 70° C. produced a brown sheet of rubber-like product with a toughness and elasticity similar to those properties of soft gum rubber.

The condensation of the crude di- and tetrachlorodipropyl sulfides with sodium tetrasulfide solution was repeated in a larger batch and the washed aqueous suspension was compounded before coagulation to give a composite with the following composition:

| | Parts by weight |
|---|---|
| Polymer | 100 |
| Zinc oxide | 20 |
| Stearic acid | 0.7 |
| Benzothiazyl disulfide | 0.4 |
| Diphenylguanidine | 0.13 |
| Carbon black | 27 |

The well mixed compounding ingredients were stirred into a smooth slurry with the dispersed polymer and the resultant mixture was then coagulated to an easily filterable, crumbly mass by the addition of dilute hydrochloric acid. The wet product so produced was aggregated to some extent by cold working in a rubber mill and then oven-dried at 75° C. to remove water. Samples thereof were cured by heating at 110° C. for 1, 2, 4, and 8 hours and press molded into test sheets. The sample treated for 8 hours gave a tough, elastic rubber-like material and seemed somewhat superior to samples heated for shorter times.

For the purpose of determining oil resistance, strips of 0.25 inch width were cut from molded test sheets of raw polymer and compounded polymer cured for 1, 2, 4, and 8 hours. The hardness index and thickness of the samples were measured before and after immersion in Finol, a paraffinic lubricating oil, during periods of 24 and 192 hours. These data, given in the table, were obtained as follows: The hardness index was measured by a Shore "A" Durometer on the test strips backed by glass. The hardness at initial contact and after 10 seconds sustained contact are indicated thusly, $D_1/D_{10}$ sec. The latter value is an index of the plasticity. The thickness, in inches, was measured by a Randall-Stickney dial gage designed for use on rubber. Each of the results given in the table is the average of 3 measurements made on each property.

*Effect of Finol on polymeric propyl sulfides*

| Sample | Hardness index | | | Thickness of test strip, inches | | |
|---|---|---|---|---|---|---|
| | Initial | After oil immersion for, hrs. | | Initial | After oil immersion for, hrs. | |
| | | 24 | 192 | | 24 | 192 |
| Raw polymer | 38/33 | 31/30 | 37/33 | 0.0751 | 0.0760 | 0.0759 |
| Compounded polymer cured 1 hour | 42/37 | 39/31 | 45/40 | .0813 | .0813 | .0812 |
| 2 hours | 45/38 | 42/35 | 45/40 | .0777 | .0776 | .0775 |
| 4 hours | 46/38 | 44/38 | 45/42 | .0776 | .0778 | .0775 |
| 8 hours | 47/42 | 44/40 | 48/42 | .0860 | .0859 | .0858 |

These results show that Finol had practically no swelling effect on the raw and compounded polymers during immersion in said oil for a period of up to 192 hours. In general, the samples tended to shrink very slightly in thickness due probably to a leaching out effect of the oil; discoloration of the oil was also least here for the raw polymer. The Durometer hardness of these samples dropped somewhat at 24 hours but appears to be nearly restored after immersion for 192 hours. It is therefore concluded that the raw rubber-like polymer and cured compounded polymers are resistant to swelling in the presence of a paraffinic lubricating oil.

The character of the present invention and type of results obtained are evident from the preceding specification and example, although they are not to be considered as imposing undue limitations upon its generally broad scope.

We claim as our invention:

1. A process which comprises reacting a branched chain dichlorodialkyl sulfide and a polyhalo dialkyl sulfide containing at least three but not more than four halogen atoms per molecule with an aqueous solution of a water-soluble polysulfide to form an elastomer.

2. A process which comprises reacting a branched chain dichlorodipropyl sulfide and a polyhalo dialkyl sulfide containing at least three but not more than four halogen atoms per molecule with an aqueous solution of a water-soluble inorganic polysulfide to form an elastomer.

3. A process which comprises reacting a branched chain dichlorodipropyl sulfide and a polyhalo dialkyl sulfide containing at least three but not more than four halogen atoms per molecule with an aqueous solution of a polysulfide of an alkali metal to form an elastomer.

4. A process which comprises reacting a branched chain dichlorodipropyl sulfide and a polyhalo dialkyl sulfide containing at least three but not more than four halogen atoms per molecule with an aqueous solution of a calcium polysulfide to form an elastomer.

5. A process which comprises reacting a branched chain dichlorodialkyl sulfide and a polyhalo dialkyl sulfide containing at least three but not more than four halogen atoms per molecule with an aqueous solution of a water-soluble polysulfide in the presence of a dispersing agent to form an elastomer.

6. A process which comprises reacting a branched chain dichlorodipropyl sulfide and a polyhalo dialkyl sulfide containing at least three but not more than four halogen atoms per molecule with an aqueous solution of a water-soluble inorganic polysulfide in the presence of a dispersing agent to form an elastomer.

7. A process which comprises reacting a branched chain dichlorodipropyl sulfide and a polyhalo dialkyl sulfide containing at least three but not more than four halogen atoms per molecule with an aqueous solution of a water-soluble inorganic polysulfide in the presence of a dispersing agent comprising magnesium hydroxide to form an elastomer.

8. The process of claim 1 further characterized in that said water-soluble polysulfide includes a polysulfide of an alkaline earth metal.

9. An elastomer formed by reacting a branched chain dichlorodipropyl sulfide, a polyhalodialkyl sulfide containing at least three but not more than four halogen atoms per molecule, and an aqueous solution of a water-soluble inorganic polysulfide.

IVAR H. KINNEBERG.
CHARLES L. THOMAS.